(12) United States Patent
Patterson et al.

(10) Patent No.: US 9,535,624 B1
(45) Date of Patent: Jan. 3, 2017

(54) DUPLICATE MANAGEMENT

(75) Inventors: R. Hugo Patterson, Mountain View, CA (US); Ming Benjamin Zhu, Palo Alto, CA (US); Edward K. Lee, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 11/197,126

(22) Filed: Aug. 4, 2005

Related U.S. Application Data (63) Continuation-in-part of application No. 10/940,408, filed on Sep. 13, 2004, now Pat. No. 7,631,144.

(51) Int. Cl.
*G06F 3/06* (2006.01)

(52) U.S. Cl.
CPC ........... *G06F 3/0641* (2013.01); *G06F 3/0608* (2013.01); *G06F 3/0673* (2013.01)

(58) Field of Classification Search
USPC ........ 711/154, 159, 118, 133; 707/101, 102, 707/203, 204
See application file for complete search history.

(56) References Cited

U.S. PATENT DOCUMENTS

| | | | |
|---|---|---|---|
| 5,765,173 A * | 6/1998 | Cane et al. .................... | 707/204 |
| 5,813,008 A * | 9/1998 | Benson et al. | |
| 6,081,805 A * | 6/2000 | Guha | |
| 6,226,728 B1 * | 5/2001 | See et al. ...................... | 711/171 |
| 6,363,381 B1 * | 3/2002 | Lee et al. | |
| 6,477,544 B1 * | 11/2002 | Bolosky et al. | |
| 6,597,405 B1 * | 7/2003 | Iggulden ....................... | 348/553 |
| 6,795,903 B2 * | 9/2004 | Schultz et al. ................ | 711/154 |
| 6,967,802 B1 * | 11/2005 | Bailey .......................... | 360/72.1 |
| 6,983,365 B1 * | 1/2006 | Douceur et al. .............. | 713/165 |
| 7,069,270 B1 * | 6/2006 | Kumar | |
| 7,103,608 B1 * | 9/2006 | Ozbutun et al. .............. | 707/604 |
| 7,103,740 B1 * | 9/2006 | Colgrove et al. ............. | 711/162 |
| 7,366,718 B1 * | 4/2008 | Pugh et al. | |
| 7,496,604 B2 * | 2/2009 | Sutton et al. | |
| 2003/0204605 A1 * | 10/2003 | Hudson et al. ............... | 709/228 |
| 2005/0044561 A1 * | 2/2005 | McDonald ...................... | 725/18 |

OTHER PUBLICATIONS

Hong et al. Duplicate data elimination in a SAN file system. 2004. In Proceedings of the 21st IEEE / 12th NASA Goddard Conference on Mass Storage Systems and Technologies (MSST). pp. 301-314.*
Cooley, Joe, Chris Taylor, and Alen Peacock. "ABS: the apportioned backup system." MITLaboratory for Computer Science (2004).*

(Continued)

*Primary Examiner* — Yaima Rigol
(74) *Attorney, Agent, or Firm* — Blakely, Sokoloff, Taylor & Zafman LLP (57) ABSTRACT

A method of managing duplicate segments from a segmented file storage system is disclosed. The method comprises indexing a segment according to a key for the segments wherein the index includes an identification of a first data location where the segment is stored and identifying a duplicate segment having the same key that is stored in a second location. The method further comprises determining that the duplicate segment is an undesired duplicate segment and eliminating the undesired duplicate segment.

49 Claims, 8 Drawing Sheets

(56) References Cited

OTHER PUBLICATIONS

Shuff, Pat, and Jagadeesyh Dyaberi. "Hash addressing viability for use in distributed file systems." ACM International Conference Proceeding Series. vol. 58. 2004.*

Douceur, John R., et al. "Reclaiming space from duplicate files in a serverless distributed file system." Distributed Computing Systems, 2002. Proceedings. 22nd International Conference on. IEEE, 2002.*

* cited by examiner

DUPLICATE MANAGEMENT

CROSS REFERENCE TO OTHER APPLICATIONS

This application is a continuation in part of co-pending U.S. patent application Ser. No. 10/940,408, now U.S. Pat. No. 7,631,144, entitled WRITE LATENCY EFFICIENT STORAGE SYSTEM filed Sep. 13, 2004, which is incorporated herein by reference for all purposes.

BACKGROUND OF THE INVENTION

Some data storage systems attempt to store data segments with no redundancy in order to efficiently use the storage space available. This is particularly applicable for back-up systems. However, there are situations when, either for speed requirements during the writing process or for speed requirements during the reading process, having redundant data segments is useful. During the writing process, there may be too much time involved in establishing whether or not a segment is already stored on the system so that just storing the segment is expedient. One problem is that this could lead to storing some redundant segments. During the reading process, there may be too much retrieval time overhead if the segments being read are stored far from each other. So, in order to make the reading process efficient, all segments likely to be read together should be stored close to each other. This could lead to storing redundant segments. As time passes away from the time that the segments were all stored together, and as files get removed from the system, some segments are no longer referenced, consequently the corresponding redundant segments need not be kept; other duplicate segments provide no additional performance benefits for retrieval. Therefore, it would be useful to be able to manage the redundant segments so that storage space efficiency can be achieved while still maintaining read and write process efficiencies.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A duplicate management system is disclosed. The duplicate management system identifies a duplicate segment in a data storage system. Identification of the duplicate segment can use an index of the segments created from a key which is a hash function of the segment content or data, a direct comparison of segments, or a summary vector. The duplicate management system also determines whether the identified duplicate segment is to be eliminated or kept and eliminates the undesired duplicate segments.

Figure 1:
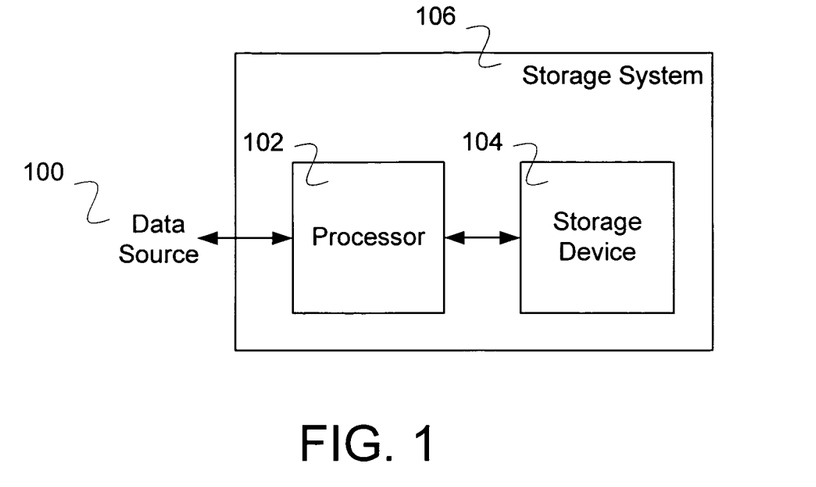
FIG. 1 is a block diagram illustrating a typical storage system.

FIG. 1 is a block diagram illustrating a typical storage system. Data are generated from data source 100. Data source 100 streams data content to storage system 106. Storage system 106 receives the data streams, optionally processes in processor 102 the data streams, and stores the data to storage device 104. The storage system can consist of a single unit that includes processors and storage devices or multiple units in which processors and storage devices are connected via a network. In some embodiments, the storage devices are semiconductor memories, hard drives, optical drives, and/or tape drives.

When moving data such as backup data from data source 100 to storage device 104. Commonly, there is a substantial amount of repetition in the data. This is particularly true in a backup application when substantially the same data are written to the storage device at regular time intervals. To improve efficiency, storage systems check whether portions of the data, or segments, have been previously stored.

Figure 2:
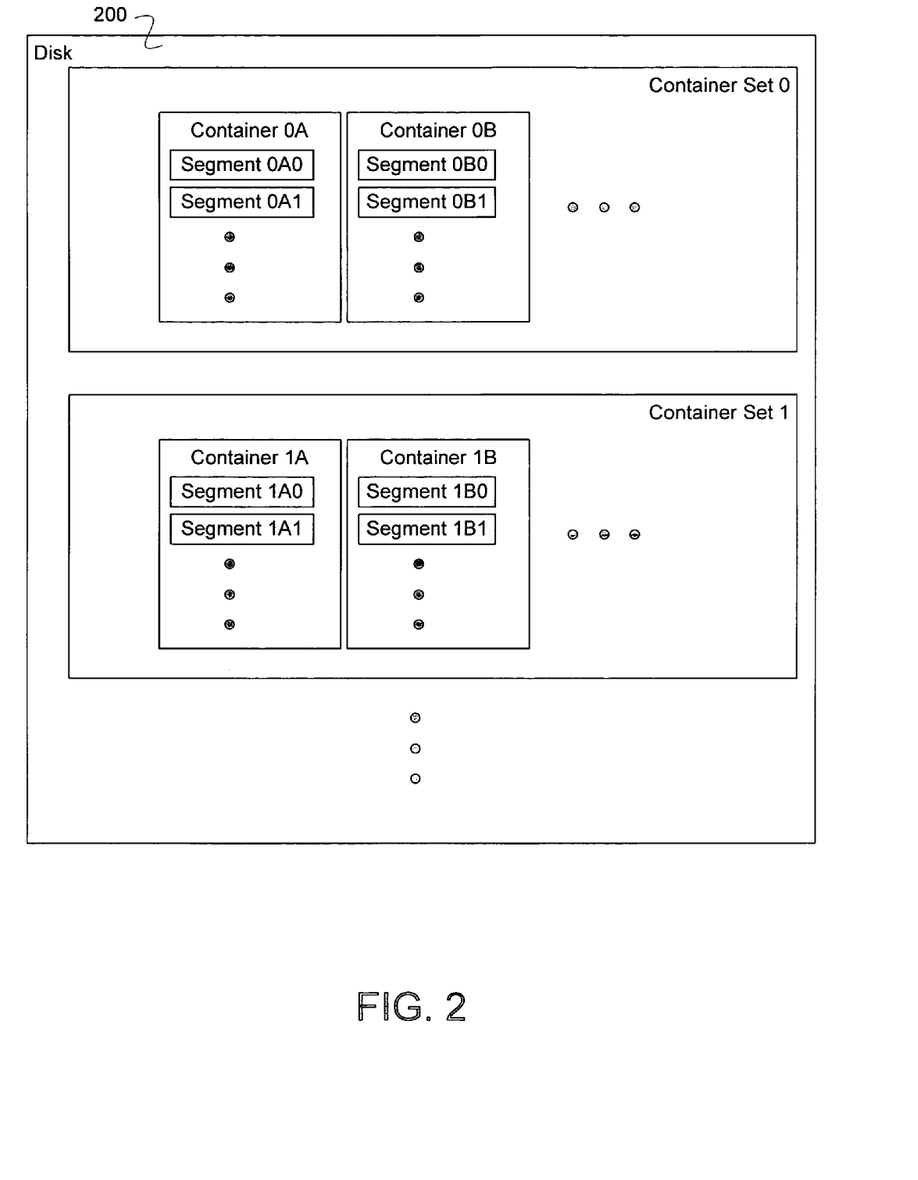
FIG. 2 illustrates an embodiment of a disk data storage system.

FIG. 2 illustrates an embodiment of a disk data storage system. In the example illustrated, disk 200 includes a plurality of container sets. Container sets include a plurality of containers. Containers include a plurality of segments. In the example illustrated, container set 0 includes containers 0A and 0B. Container 0A includes segment 0A0 and segment 0A1. Container 0B includes segment 0B0 and segment 0B1. Similarly, container set 1 includes containers 1A and 1B. Container 1A includes segment 1A0 and segment 1A1. Container 1B includes segment 1B0 and segment 1B1. The data may be separated into segments such that the segments can be readily matched with segments from previous or future streams according to the techniques disclosed in *Finding Similar Files in a Large File System* (Udi Manber, Technical Report TR 93-33, University of Arizona, October 1993). A data segment is then associated with an identifier, or segment ID. Techniques for creating identifiers are described in U.S. patent application Ser. No. 10/611,309, now U.S. Pat. No. 7,143,251, entitled: "DATA STORAGE USING IDENTIFIERS" which is incorporated by reference for all purposes.

Figure 3:
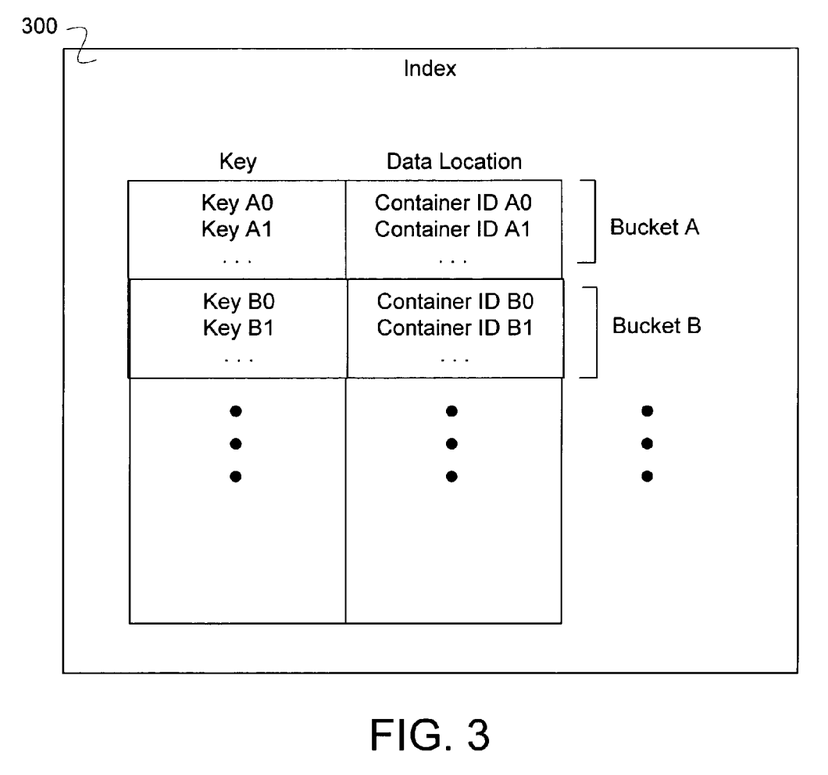
FIG. 3 illustrates an embodiment of an index.

FIG. 3 illustrates an embodiment of an index. In the example illustrated, index 300 contains a table of keys and corresponding data locations. In some embodiments, the key is a hash of the data in the segment. In some embodiments, the key is a shortened ID for the data in the segment and matching keys is not sufficient for determining if the corresponding segments are the same. For shortened ID's additional checking must be done in order to determine if the segments are the same. The keys in the index and corresponding data locations are grouped into buckets, wherein a bucket is a subset of the index that can be loaded in its entirety into the processor memory to be analyzed. In some embodiments, the data locations are container ID's. In the example illustrated, bucket A includes key A0 and key A1 and the corresponding data locations container ID A0 and container ID A1, respectively. Similarly, bucket B includes key B0 and key B1 and the corresponding data locations container ID B0 and container ID B1, respectively. In some embodiments, duplicate segments are stored in the same index bucket.

Figure 4:
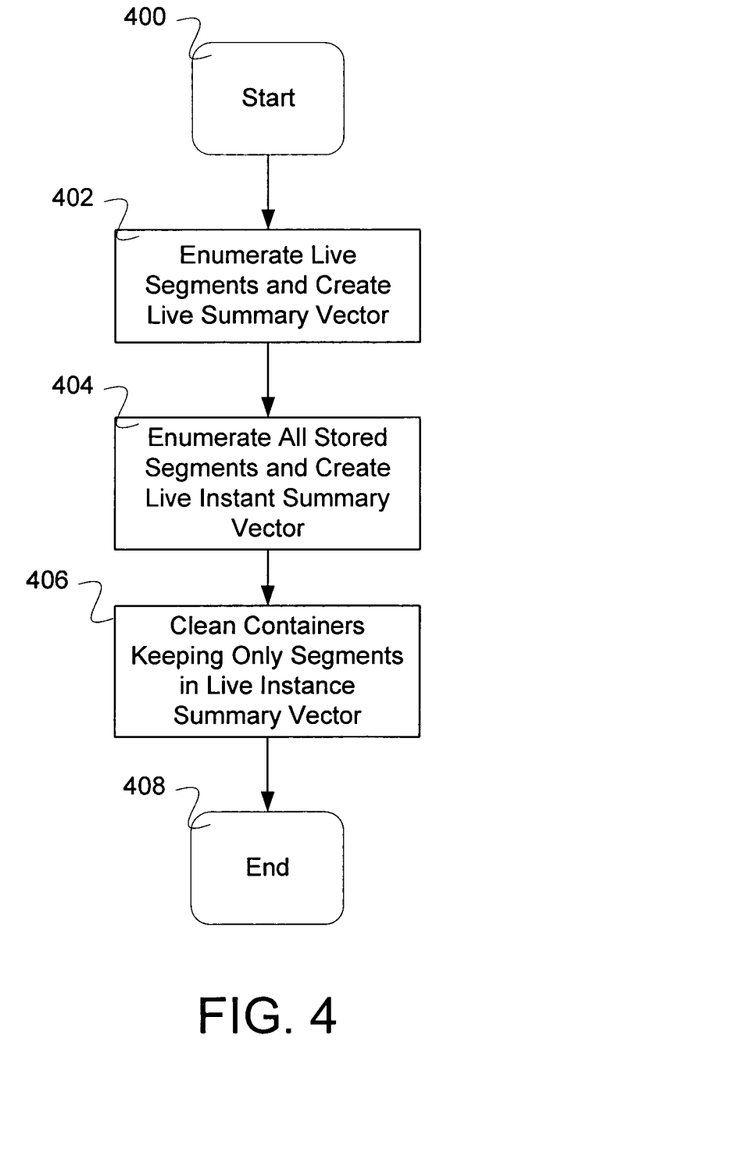
FIG. 4 illustrates an embodiment of a process for duplicate management.

FIG. 4 illustrates an embodiment of a process for duplicate management. In the example illustrated, live segments are enumerated and a live summary vector is created in 402. The live summary vector is based on hashes of the data in the segment and gives a probabilistic indication that segments are live segments. In this case, the summary technique identifies if the data segment is not live, or not referenced, but cannot indicate with certainty, only probabilistically, that the data segment is still live (or referenced). Summary techniques are described in U.S. patent application Ser. No. 10/325,690 by Zhu, et al, now U.S. Pat. No. 6,928,526, entitled: "EFFICIENT DATA STORAGE SYSTEM" which is incorporated by reference for all purposes; and also in U.S. patent application Ser. No. 10/325,479 by Zhu, et al, now U.S. Pat. No. 7,065,619, entitled "EFFICIENT DATA STORAGE SYSTEM" which is incorporated by reference for all purposes. In 404, all stored segments are enumerated and a live instance summary vector is created. The live instance summary vector is based on hashes of the data in the segment and the segment location and gives a probabilistic indication that segments are not undesired duplicate segments. In this case, the summary technique cannot indicate with certainty, only probabilistically, that the data segment is not an undesired duplicate segment; there may be some undesired duplicate segments that are not identified. In 406, the containers are cleaned keeping only the segments in the live instance summary vector.

In the example illustrated in FIG. 4, the process is similar to the garbage collection process described in application Ser. No. 10/611,237, now U.S. Pat. No. 7,424,498, entitled "PROBABILISTIC SUMMARY DATA STRUCTURE BASED ENCODING FOR GARBAGE COLLECTION", filed on Jun. 30, 2003, and in application Ser. No. 10/611,291, now U.S. Pat. No. 7,451,168, entitled "INCREMENTAL GARBAGE COLLECTION OF DATA IN A SECONDARY STORAGE", filed on Jun. 30, 2003, which are herein incorporated by reference for all purposes.

Figure 5:
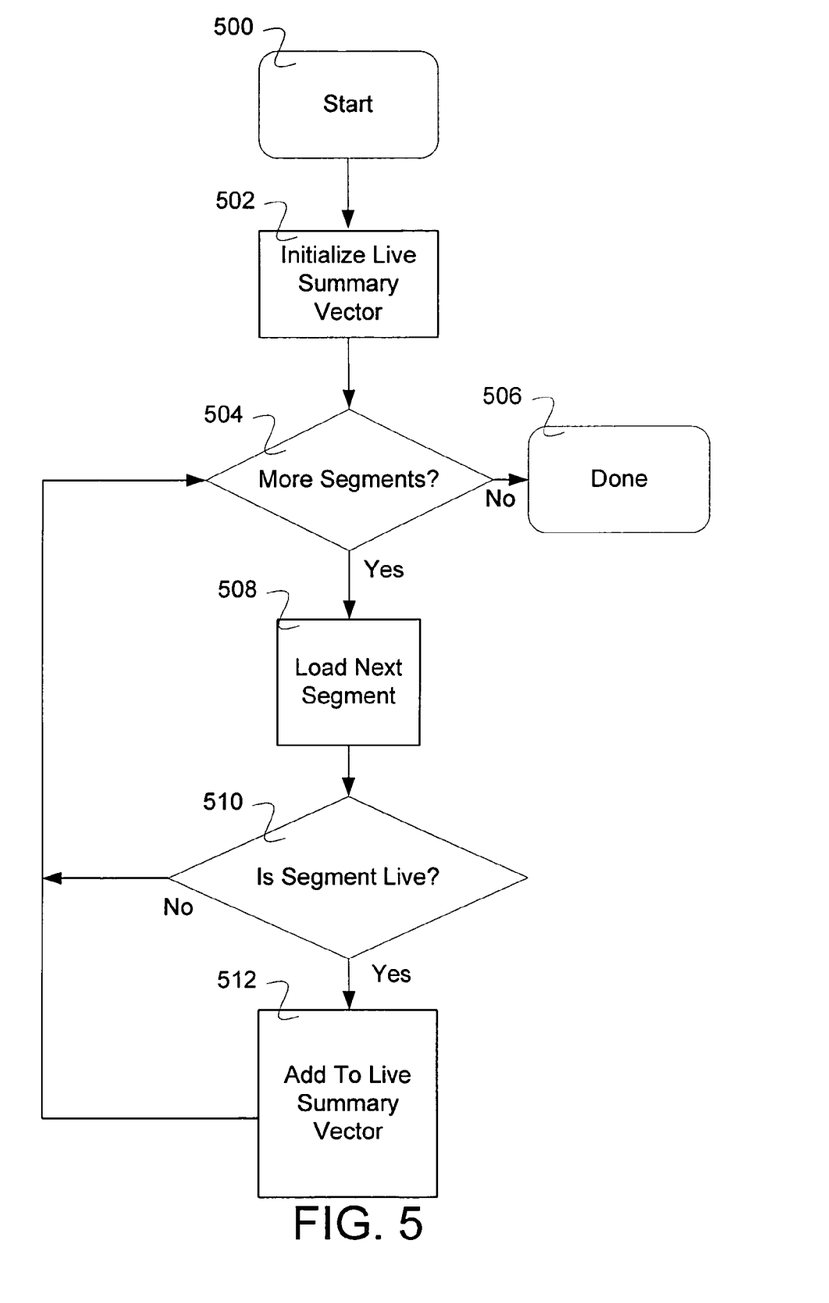
FIG. 5 illustrates an embodiment of a process for enumerating live segments and creating a live summary vector.

FIG. 5 illustrates an embodiment of a process for enumerating live segments and creating a live summary vector. In the example illustrated, a live summary vector is initialized in 502. In 504, it is determined if there are more (undeleted) files to analyze. If there are no more files to analyze, then control is passed to 506, and the process is done. If there are more files to analyze, then in 508 all segments referenced in the file are added to the live summary vector, and control returns to 504. If the segment is not live, then control returns to 504.

Figure 6:
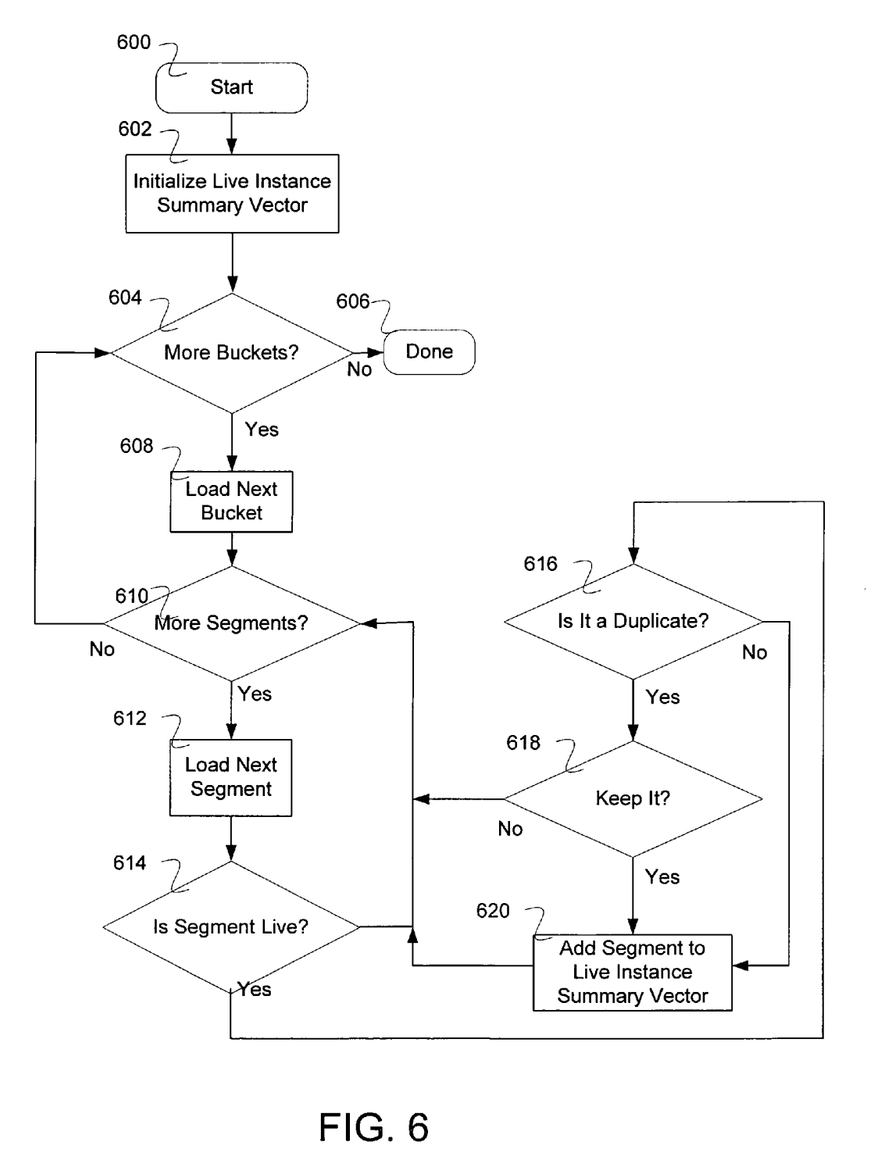
FIG. 6 illustrates an embodiment of a process for enumerating all stored segments and creating a live instanced summary vector.

FIG. 6 illustrates an embodiment of a process for enumerating all stored segments and creating a live instanced summary vector. In the example illustrated, the live instance summary vector is initialized in 602. In 604, it is determined if there are any more (index) buckets to analyze. If there are no buckets to analyze, then control passes to 606 and the process is done. If there are buckets to analyze, then in 608 the next bucket is loaded for analysis. In 610, it is determined if there are more segments to analyze in the bucket. If there are not more segments to analyze in the bucket, then control is passed to 604. If there are more segments to analyze in the bucket, then in 612 the next segment is loaded for analysis. In 614, it is determined if the segment is live. In some embodiments, a segment is live if the segment is referenced (equivalent to not deleted) in the system. In some embodiments, a segment is live if it is in the live summary vector. If the segment is not live, then control is passed to 610. If the segment is live, then in 616 it is determined if the segment is a duplicate. In some embodiments, a segment is a duplicate if it is already in the live instance summary vector. In some embodiments, a segment is a duplicate if it shares the same key as another segment in the bucket. If the segment is not a duplicate, then in 620 the segment is added to the live instance summary vector and control is passed to 610. If the segment is a duplicate, then it is determined if the segment is to be kept in 618. In some embodiments, it is determined if the segment is to be eliminated in 618. If the segment is to be kept, then in 620 the segment is added to the live instance summary vector and control is passed to 610. If the segment is not to be kept, then control passes to 610.

In some embodiments, a predetermined number of most recent copies of the segment are kept. For example, if the predetermined number is 1 then the most recent copy is kept or if the predetermined number is 2 then the two most recent copies are kept. In some embodiments, every copy stored more recently than a predetermined time is kept. For example, if the predetermined time is 12 AM on Jan. 1, 2000 then all copies stored more recently than 12 AM on Jan. 1, 2000 are kept or if the predetermined time is 3 PM on Feb. 1, 2005 then all copies stored more recently than 3 PM on Feb. 1, 2005 are kept. In some embodiments, the segment is kept if keeping the segment allows the system to efficiently retrieve the stored data. In some embodiments, every copy accessed more recently than a predetermined time is kept. For example, if the predetermined time is 12 AM on Jan. 1, 2000 then all copies accessed more recently than 12 AM on Jan. 1, 2000 are kept or if the predetermined time is 3 PM on Feb. 1, 2005 then all copies accessed more recently than 3 PM on Feb. 1, 2005 are kept. In some embodiments, the segment is not kept if its elimination does not slow down data retrieval.

Figure 7:
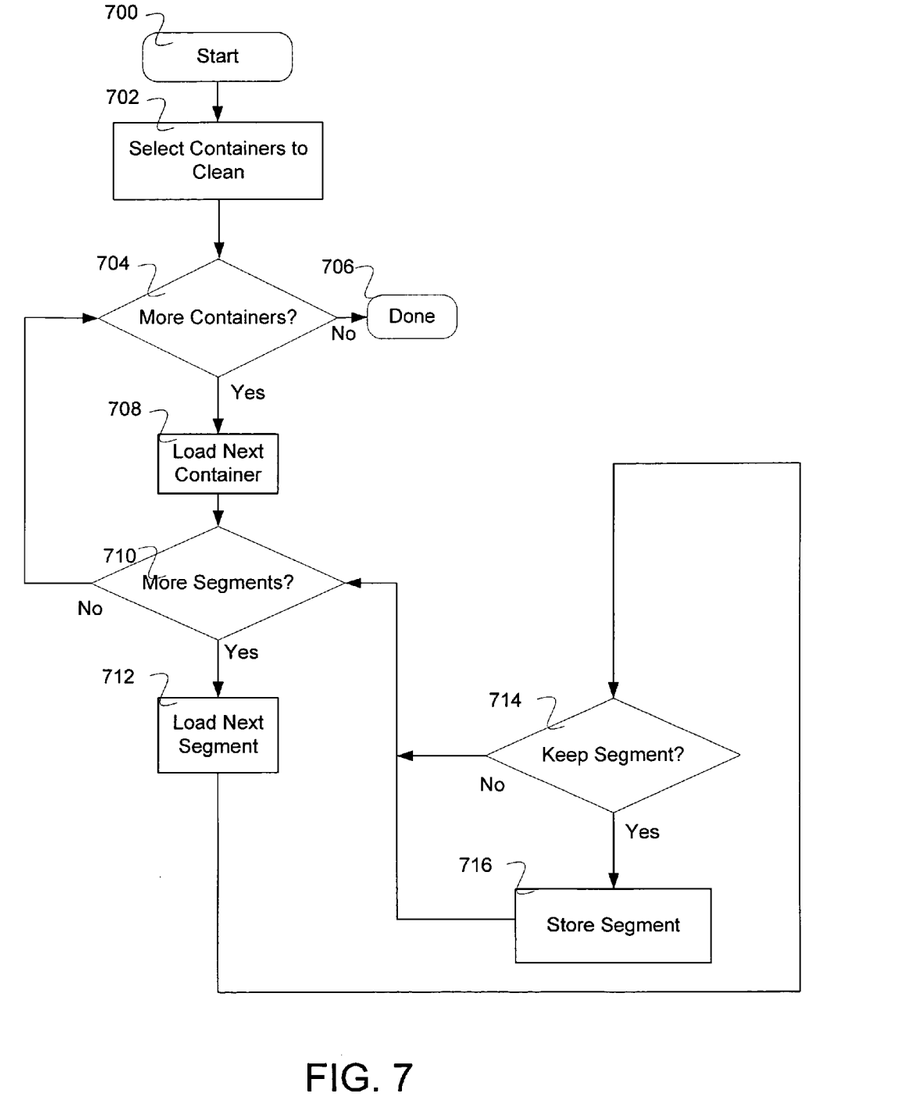
FIG. 7 illustrates an embodiment of a process for cleaning containers.

FIG. 7 illustrates an embodiment of a process for cleaning containers. In the example illustrated, the containers to clean are selected in 702. In 704, it is determined if there are more containers to clean. If there are no more containers to clean, then control passes to 706 and the process is done. If there are more containers to clean, then in 708 the next container is loaded. In 710, it is determined if there are more segments to analyze. If there not more segments to analyze, then control passes to 704. If there are more segments to analyze, then in 712 the next segment is loaded. In 714, it is determined if the segment is to be kept. In some embodiments, it is determined if the segment is to be eliminated in 714. If the segment is to be kept, then in 716, the segment is stored and control passes to 710. If the segment is not to be kept, then control passes to 710. In some embodiments, the cleaned containers are repacked. Repacking includes storing the stored data segments so that the space is efficiently used in the container, and updating the index.

Figure 8:
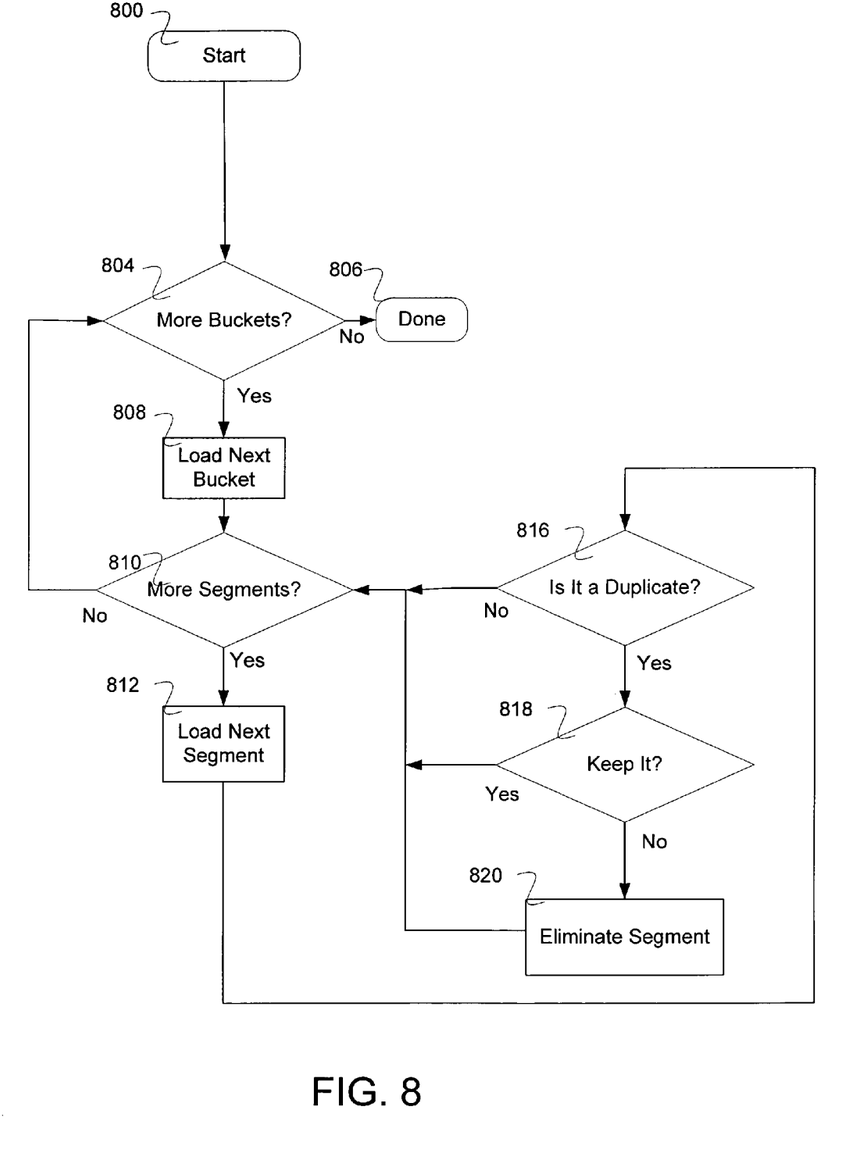
FIG. 8 illustrates an embodiment of a process for duplicate management.

FIG. 8 illustrates an embodiment of a process for duplicate management. In the example illustrated it is determined if there are any more buckets to analyze in 804. If there are no buckets to analyze, then control passes to 806 and the process is done. If there are buckets to analyze, then in 808 the next bucket is loaded for analysis. In 810, it is determined if there are more segments to analyze in the bucket. If there are not more segments to analyze in the bucket, then control is passed to 804. If there are more segments to analyze in the bucket, then in 812 the next segment is loaded for analysis. In 816 it is determined if the segment is a duplicate. If the segment is not a duplicate, then control is passed to 810. In some embodiments, the segment is determined to be a duplicate, if it shares the same key as another segment in the bucket. In some embodiments, the segment is determined to be a duplicate using a summary vector; if it's not, it is added to the summary vector. If the segment is a duplicate, then it is determined if the segment is to be kept in 818. In some embodiments, it is determined if the segment is to be eliminated in 818. If the segment is not to be kept, then in 820 the segment is eliminated and control is passed to 810. If the segment is not to be kept, then control passes to 810.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing duplicate segments from a segmented file storage system including:
    indexing each of a plurality of segments with a correspondingly associated key, the index including an identification of a first data location where a first segment is stored;
    identifying a duplicate segment associated with a duplicate key matching a first key associated with the first segment and stored in a second data location;
    determining whether the duplicate segment is an undesired duplicate segment based at least in part on an amount of time that has passed since an operation associated with the duplicate segment;
    eliminating the duplicate segment if the duplicate segment is determined to be an undesired duplicate segment, wherein the duplicate segment is an undesired duplicate segment in the event the amount of time has passed since the operation associated with the duplicate segment; and
    retaining the duplicate segment if the duplicate segment is not determined to be an undesired duplicate segment, wherein the duplicate segment is not an undesired duplicate segment in the event the amount of time has not passed since the operation associated with the duplicate segment.

2. A method as in claim 1, wherein the key is a hash function of content of the segment.

3. A method as in claim 1, wherein a duplicate segment is an undesired duplicate segment if the segment is not one of a predetermined number of most recently stored segments.

4. A method as in claim 1, wherein a duplicate segment is an undesired duplicate segment if the segment was not accessed more recently than a predetermined time.

5. A method as in claim 1, wherein a duplicate segment is an undesired duplicate segment if the segment was not stored more recently than a predetermined time.

6. A method as in claim 1, wherein the identification of the first data location is a container ID.

7. A method as in claim 1, wherein determining that the duplicate segment is an undesired duplicate segment includes noting segments to eliminate.

8. A method as in claim 1, wherein determining that the duplicate segment is an undesired duplicate segment includes noting segments to keep.

9. A method as in claim 1, wherein determining that the duplicate segment is an undesired duplicate segment includes creating a live instance summary vector of segments that are not determined undesired duplicate segments.

10. A method as in claim 1, wherein determining that the duplicate segment is an undesired duplicate segment includes creating a live instance summary vector of segments that are not identified undesired duplicates and wherein the live instance summary vector gives a probabilistic indication that segments are not undesired duplicate segments.

11. A method as in claim 9, wherein determining that the duplicate segment is an undesired duplicate segment includes creating a live summary vector of segments that are referenced and comparing segments to the live summary vector and the live instance summary vector.

12. A method as in claim 1, further including repacking data containers having eliminated segments.

13. A method as in claim 1, wherein the operation associated with the duplicate segment includes: storing the duplicate segment and accessing the duplicate segment.

14. A method of managing duplicate segments from a segmented file storage system including:
    identifying a first segment that is stored in a first data location;
    identifying a second segment as being a duplicate of the first segment that is stored in a second data location;
    determining whether the second segment is an undesired duplicate segment based at least in part on an amount of time that has passed since an operation associated with the second segment;
    eliminating the second segment if the second segment is determined to be an undesired duplicate segment, wherein the second segment is an undesired segment in the event the amount of time has passed since the operation associated with the second segment; and
    retaining the second segment if the second segment is not determined to be an undesired duplicate segment, wherein the second segment is not an undesired duplicate segment in the event the amount of time has not passed since the operation associated with the second segment,
    wherein identifying the second segment as being a duplicate of the first segment includes loading and analyzing indexes for data segments.

15. A method as in claim 14, wherein identifying a second segment as being a duplicate of the first segment uses a summary vector.

16. A method as in claim 14, wherein a second segment is an undesired duplicate segment if the segment is not one of a predetermined number of most recently stored segments.

17. A method as in claim 14, wherein a second segment is an undesired duplicate segment if the segment was not stored more recently than a predetermined time.

18. A method as in claim 14, wherein a second segment is an undesired duplicate segment if the segment was not accessed more recently than a predetermined time.

19. A method as in claim 14, wherein determining that the second segment is an undesired duplicate segment includes noting segments to eliminate.

20. A method as in claim 14, wherein determining that the second segment is an undesired duplicate segment includes noting segments to keep.

21. A method as in claim 14, wherein determining that the second segment is an undesired duplicate segment includes creating a live instance summary vector of segments that are not determined undesired duplicate segments.

22. A method as in claim 21, wherein determining that the second segment is an undesired duplicate segment includes creating a live summary vector of segments that are referenced and comparing segments to the live summary vector and the live instance summary vector.

23. A method as in claim 14, wherein determining that the second segment is an undesired duplicate segment includes creating a live instance summary vector of segments that are not identified undesired duplicates and wherein the live instance summary vector gives a probabilistic indication that segments are not undesired duplicate segments.

24. A method as in claim 14, further including repacking data containers having eliminated segments.

25. A computer program product for managing duplicate segments from a segmented file storage system, the computer program product being embodied in a non-transitory computer readable medium and comprising computer instructions for:
  indexing each of a plurality of segments with a correspondingly associated key, the index including an identification of a first data location where a first segment is;
  identifying a duplicate segment associated with a duplicate key matching a first key associated with the first segment and stored in a second data location;
  determining whether the duplicate segment is an undesired duplicate segment based at least in part on an amount of time that has passed since an operation associated with the duplicate segment;
  eliminating the duplicate segment if the duplicate segment is determined to be an undesired duplicate segment, wherein the duplicate segment is an undesired duplicate segment in the event the amount of time has passed since the operation associated with the duplicate segment; and
  retaining the duplicate segment if the duplicate segment is not determined to be an undesired duplicate segment, wherein the duplicate segment is not an undesired duplicate segment in the event the amount of time has not passed since the operation associated with the duplicate segment.

26. A computer program product as recited in claim 25, wherein the key is a hash function of the segment content.

27. A computer program product as recited in claim 25, wherein a duplicate segment is an undesired duplicate segment if the segment is not one of a predetermined number of most recently stored segments.

28. A computer program product as recited in claim 25, wherein a duplicate segment is an undesired duplicate segment if the segment was not accessed more recently than a predetermined time.

29. A computer program product as recited in claim 25, wherein a duplicate segment is an undesired duplicate segment if the segment was not stored more recently than a predetermined time.

30. A computer program product as recited in claim 25, wherein the identification of the first data location is a container ID.

31. A computer program product as recited in claim 25, wherein determining that the duplicate segment is an undesired duplicate segment includes noting segments to eliminate.

32. A computer program product as recited in claim 25, wherein determining that the duplicate segment is an undesired duplicate segment includes noting segments to keep.

33. A computer program product as recited in claim 25, wherein determining that the duplicate segment is an undesired duplicate segment includes creating a live instance summary vector of segments that are not determined undesired duplicate segments.

34. A computer program product as recited in claim 33, wherein determining that the duplicate segment is an undesired duplicate segment includes creating a live summary vector of segments that are referenced and comparing segments to the live summary vector and the live instance summary vector.

35. A computer program product as recited in claim 25, wherein determining that the duplicate segment is an undesired duplicate segment includes creating a live instance summary vector of segments that are not identified undesired duplicates and wherein the live instance summary vector gives a probabilistic indication that segments are not undesired duplicate segments.

36. A computer program product as recited in claim 25, further including repacking data containers having eliminated segments.

37. A computer program product for managing duplicate segments from a segmented file storage system, the computer program product being embodied in a non-transitory computer readable medium and comprising computer instructions for:
  identifying a first segment that is stored in a first data location;
  identifying a second segment as being a duplicate of the first segment that is stored in a second data location;
  determining whether the second segment is an undesired duplicate segment based at least in part on an amount of time that has passed since an operation associated with the second segment;
  eliminating the second segment if the second segment is determined to be an undesired duplicate segment, wherein the second segment is an undesired duplicate segment in the event the amount of time has passed since the operation associated with the second segment; and
  retaining the second segment if the second segment is not determined to be an undesired duplicate segment, wherein the second segment is not an undesired duplicate segment in the event the amount of time has not passed since the operation associated with the second segment.

38. A computer program product as recited in claim 37, wherein identifying a second segment as being a duplicate of the first segment uses a summary vector.

39. A computer program product as recited in claim 37, wherein a second segment is an undesired duplicate segment if the segment is not one of a predetermined number of most recently stored segments.

40. A computer program product as recited in claim 37, wherein a second segment is an undesired duplicate segment if the segment was not stored more recently than a predetermined time.

41. A computer program product as recited in claim 37, wherein a second segment is an undesired duplicate segment if the segment was not accessed more recently than a predetermined time.

42. A computer program product as recited in claim 37, wherein determining that the second segment is an undesired duplicate segment includes noting segments to eliminate.

43. A computer program product as recited in claim 37, wherein determining that the second segment is an undesired duplicate segment includes noting segments to keep.

44. A computer program product as recited in claim 37, wherein determining that the second segment is an undesired duplicate segment includes creating a live instance summary vector of segments that are not determined undesired duplicate segments.

45. A computer program product as recited in claim 44, wherein determining that the second segment is an undesired duplicate segment includes creating a live summary vector of segments that are referenced and comparing segments to the live summary vector and the live instance summary vector.

46. A computer program product as recited in claim 37, wherein determining that the second segment is an undesired duplicate segment includes creating a live instance summary vector of segments that are not identified undesired duplicates and wherein the live instance summary vector gives a probabilistic indication that segments are not undesired duplicate segments.

47. A computer program product as recited in claim 37, further including repacking data containers having eliminated segments.

48. A system for managing duplicate segments from a segmented file storage system including:
   an indexer having one or more processors for indexing each of a plurality of segments with a correspondingly associated key, the index including an identification of a first data location where a first segment is stored;
   an identifier having one or more processors for identifying a duplicate segment associated with a duplicate key matching a first key associated with the first segment and stored in a second data location;
   a determiner having one or more processors for determining whether the duplicate segment is an undesired duplicate segment based at least in part on an amount of time that has passed since an operation associated with the duplicate segment; and
   an eliminator having one or more processors for eliminating the duplicate segment if the duplicate segment is determined to be an undesired duplicate segment, wherein the duplicate segment is an undesired duplicate segment in the event the amount of time has passed since the operation associated with the duplicate segment, and retaining the duplicate segment if the duplicate segment is not determined to be an undesired duplicate segment, wherein the duplicate segment is not an undesired duplicate segment in the event the amount of time has not passed since the operation associated with the duplicate segment.

49. A system for managing duplicate segments from a segmented file storage system including:
   an identifier having one or more processors identifying a first segment that is stored in a first data location, and identifying a second segment as being a duplicate of the first segment that is stored in a second data location;
   a determiner having one or more processors for determining whether the second segment is an undesired duplicate to an object based at least in part on an amount of time that has passed since an operation associated with the second segment; and
   an eliminator having one or more processors for eliminating the second segment if the second segment is determined to be an undesired duplicate segment, wherein the second segment is an undesired duplicate segment in the event the amount of time has passed since the operation associated with the second segment, and retaining the second segment if the second segment is not determined to be an undesired duplicate segment, wherein the second segment is not an undesired duplicate segment in the event the amount of time has not passed since the operation associated with the second segment,
   wherein identifying the second segment as being a duplicate of the first segment includes loading and analyzing indexes for segments.

* * * * *